United States Patent [19]

Suzuki

[11] 4,051,031
[45] Sept. 27, 1977

[54] FILTER APPARATUS

[75] Inventor: Eiji Suzuki, Tokyo, Japan

[73] Assignee: Taisei Kogyo Co., Ltd., Japan

[21] Appl. No.: 590,122

[22] Filed: June 25, 1975

[30] Foreign Application Priority Data

Nov. 20, 1974 Japan .............................. 49-140270[U]
Mar. 24, 1975 Japan .............................. 50-39285[U]

[51] Int. Cl.² ............................................. B01D 27/10
[52] U.S. Cl. .................................... 210/133; 210/136; 210/420
[58] Field of Search ............... 210/130, 133, 134, 136, 210/137, 418, 420

[56] References Cited

U.S. PATENT DOCUMENTS

| | | | |
|---|---|---|---|
| 998,585 | 7/1911 | Milner | 210/418 X |
| 1,874,847 | 8/1932 | Arnold | 210/130 X |
| 3,080,972 | 3/1963 | Smith | 210/133 X |
| 3,186,549 | 6/1965 | Botstiber | 210/130 X |
| 3,229,816 | 1/1966 | Rosaen | 210/130 |
| 3,628,662 | 12/1971 | Kudlaty | 210/136 |

Primary Examiner—Frank W. Lutter
Assistant Examiner—William A. Cuchlinski, Jr.
Attorney, Agent, or Firm—Robert E. Burns; Emmanuel J. Lobato; Bruce L. Adams

[57] ABSTRACT

A filter apparatus having a main valve provided with a first portion, a second portion, and an auxiliary valve situated within the valve body adapted to open before an opening of the main valve. Another filter apparatus comprises a main valve and a by-pass valve overflowing the fluid when the fluid pressure in a filter chamber is high. Using the filter apparatus provided with check-valves incorporated in the filter apparatus, a fluid such as oil flowing through a piping system is automatically stopped and the filter element is purified or changed in a short time.

4 Claims, 3 Drawing Figures

FILTER APPARATUS

BACKGROUND OF THE INVENTION

The present invention relates to a fluid filtering mechanism, and more particularly to a fluid filter apparatus applied to a piping system through which for instance oil flows.

According to the conventional technique, there has been ordinarily used a filter apparatus having a filter chamber provided with a filter element therein capable of being removably inserted or positioned. This filter apparatus is interposed between hydraulic systems or lubricant oil supplying piping systems in order to obtain a required and desired effect. When the above described conventional apparatus disposed in a piping of the above mentioned fluid system, it is necessary to take the filter element out in order to carry out the exchange or the cleaning operation of the filter element. In this case, it is desired that the flow of the fluid in the piping system be stopped and the fluid be prevented from flowing into the filter chamber.

Therefore, in conventional, externally controllable valves have been respectively placed at a fluid inlet and a fluid outlet of the filter apparatus in order to stop the flow. When the filter element is cleaned or replaced by a new one, cleaning and removal of the filter element have been carried out after the fluid in the piping system stops flowing. Thus, in case a manually operable valve is used, the problem has occurred in view of the waste of labor and time.

SUMMARY OF INVENTION

The present invention provides a novel filler apparatus which resolves the afore-mentioned drawbacks of the conventional technique using externally controllable valves. This apparatus having a below-mentioned construction according to the present invention comprises a filter chamber into which a removable filter element is inserted, a casing having a fluid inlet and a fluid outlet placed on the same axis, these inlet and outlet being connected with the filter chamber, valve bodys respectively adapted to contact with each valve seat formed at the above described inlet and outlet of the filter apparatus casing.

In prior art, control valves such as a check valve are placed outside of the filter apparatus and in piping portions connected to the apparatus. However, according to the present invention, the filter apparatus, only stopping the oil flowing through the piping system before the exchange of the filter element automatically and momentarily shuts off contaminated fluid, for example, oil contained in the filter chambe from other oil in the piping system without carrying out any external or additional operation. In consequence, when a bottom cover of the filter chamber is removed in order to take out the filter element, only the oil of small amount in the chamber is lost.

SUMMARY OF THE INVENTION

A primary object of the present invention is to provide a filter apparatus adapted to completely and automatically intercept the flow between a filter chamber and piping portions of hydraulic piping system each connected to the chamber, solely by stopping a device or a prime mover which causes the flow of fluid of the hydraulic or piping system.

Another object of the present invention is to provide a novel filter apparatus in which a filter element of a filter apparatus can be easily exchanged without using separate check valves positioned outside of an inlet and an outlet of the apparatus.

Another object of the present invention is to provide a relatively compact type filter apparatus incorporating a valve mechanism adapted to be automatically opened and closed by checking the flow of the fluid in a fluid piping system.

A further object of the present invention is to provide another filter apparatus constructed differently from the afore-mentioned filter apparatus in which a filter element can be exchanged by losing only the fluid contained in the piping portion connected to an inlet of the filter apparatus and the fluid in the filter chamber.

Still another object of the present invention is to provide a filter apparatus having a spatial advantage due to the exterior provision of operating valves being unnecessary.

BRIEF DESCRIPTION OF THE DRAWING

Other objects and features of the present invention will become more readily apparent upon consideration of the following detailed description and of the accompanying drawings.

Two embodiments of the present invention will be explained in conjunction with the accompanying drawings in which.

DESCRIPTION OF THE PREFERRED EMBODIMENTS

Figure 1:
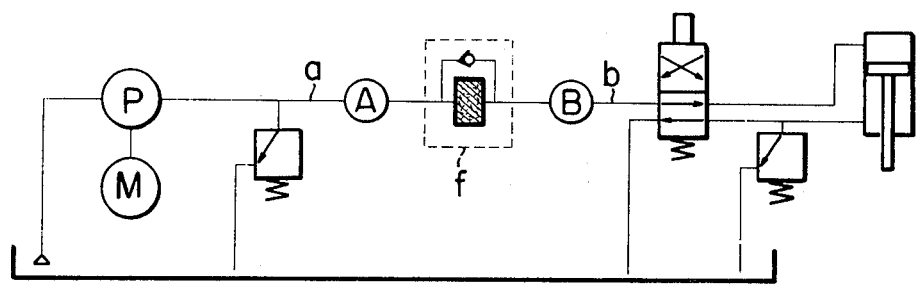
FIG. 1 is a schematic diagram of a hydraulic or fluid circuit constructed in accordance with a conventional technique, in order to describe a hydraulic circuit in which a filter apparatus of the present invention is used and exterior valves are eliminated.

Referring now to the drawing of FIG. 1, in a hydraulic circuit, there are provided check valves A, B before and behind a filter apparatus $f$. This filter apparatus $f$ is one of a prior art type. Therefore, in case of exchanging a filter element in the filter apparatus of the prior art, at first, a motor M stopped and accordingly a pump P is stopped and then the respective exterior valves are closed by hand or power. It is to be understood that if the filter apparatus of the invention is adopted, the abovesaid check valves A, B become unnecessary. This is because the fluid apparatus of this invention incorporates a valve mechanism effectively sensing the change of fluid pressure generated by the change of the operating condition of the pump in order to stop the fluid from flowing through the hydraulic circuit.

Figure 2:
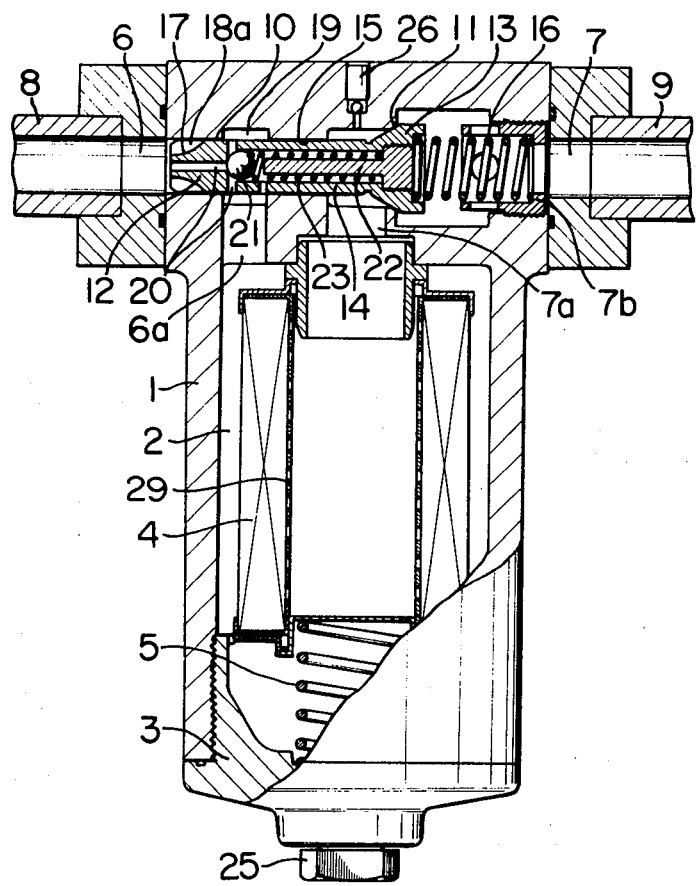
FIG. 2 is a longitudinal sectional view showing a first embodiment of the filter apparatus of the present invention.

Next, referring to FIG. 2, a first embodiment of the invention will be described hereinafter. Each member constituting the apparatus of the first embodiment is situated at its position in which fluid from an upstream piping portion 8 stops flowing and valve portions 12, 13 are each kept contacting with a respective valve seat 10, 11. That is to say, the fluid or the hydraulic pressure generated in the upstream piping portion 8 and a downstream piping portion 9 are separated from each other. Therefore, when a cover screwed to a lower end of a cylindrical casing 1 is unscrewed in order to take a filter element 4 out of a filter chamber 2 of the casing 1, oil in the chamber flows out and then the element is cleaned or changed. In the cylindrical casing 1, said element is resiliently and upwardly pressed and held at its pressed position through a compression coil spring 5 by threading and securing the cover 3. The filter element 4 is mounted within the casing 1 so as to be capable of being selectively inserted axially.

In operation when a predetermined hydraulic pressure is generated in a fluid piping portion *a* by means of a pump P, the aforesaid valve portions 12, 13 are pressed in a direction rightward in the drawing, thereby the valve portion 13 is disengaged from the valve seat 11 and a fluid passage leading to a piping portion *b* is being formed.

In a valve body 14, there is provided at a portion near to an end thereof an auxiliary fluid passage 20 connecting a fluid inlet 6 and an oil reservoir 19 to an inner fluid passage 6a. The auxiliary fluid passage 20 is closed by means of a ball valve 21 when the hydraulic pressure drops below a given level in the hydraulic system.

The ball valve 21 is always pressed and biased leftward by means of a compression spring 23 contacting the ball. When the hydraulic pressure above a predetermined value is generated within the piping system as well as the valve portions 12, 13, the ball moves rightward, thereby the fluid flows from the auxiliary fluid passage 20 to the filter chamber 2 through the inner fluid passage 6a. In consequence, the oil in the upstream piping portion 8 passes through the inner fluid passage 6a and enters into the filter chamber 2. Thereafter, the oil enters into the filter element 4 through a cylindrical wall thereof where it is filtered. Then the oil flows upwards, passes through an inner fluid passage 7a and reaches the circumference of the valve body 14. At last, the oil passes a clearance between the valve portion 13 and the valve seat 11 and enters into the down-stream piping portion 9. The above described valve body 14 is formed cylindrically in shape and respective valve portions 12, 13 and valve seats 10, 11 are adapted to be able to be liquid-tightly engaged and disengaged therefrom. A fore end of the valve portion 12 is cut off axially so as to have an axial portion 17 having a cross-shape of ribs of a suitable width in section and also having a smoothly curved wall 18a as shown in the drawing. Thus, when this valve portion 17 slides rightward so as to form a fluid passage of fluid such as oil between the valve seat 10 and the stream-lined valve portion 17, a stream-lined passage is formed for the oil.

The valve portion 13 formed at a rear end of the valve body 14 is tapered so as to have its diameter which increases gradually large towards a rear end thereof. When the valve portion 13 slides in a leftward direction in the drawing, the valve portion 13 engages or seats liquid-tightly on the valve seat 11, thereby the oil is prevented from flowing through a clearance therebetween.

Referring again to the ball valve 21, it is adapted to be used as an auxiliary valve when the valve body 14 functions as a main valve. The compression coil spring 23 is made weaker than a spring 16, so that in operation the ball valve 21 opens before the valve body 14 slides rightwards. This auxiliary valve or ball valve 21 displays its effect especially when the amount of oil flowing in the hydraulic circuit or system is relatively small. That is to say, the ball valve 21 sensitively responds to a low pressure of the fluid in the piping system and the small volume of the oil passing around the auxiliary valve 21 and through the filter element 4 reaches the circumference of the valve body 14, and presses the valve portion 13 rightward. Accordingly, at the starting and the stopping of the fluid apparatus, the auxiliary valve responses rapidly and effectively, thereby the filter element 4 is able to be cleaned or changed in a short time without waste or loss of time. When air enters into the casing 1, the removal of air valve 26 permits the entering air to be excluded.

A second embodiment of the present invention will be explained with reference to FIG. 3. The second embodiment is different from the first embodiment in construction and use. In the second embodiment, a by-pass valve 21a and a fluid passage 27 are provided and the auxiliary valve is not used in the valve body 14 and only the valve portion 17 is mounted within the valve body 14.

Next, the purpose and the operation of the abovesaid second embodiment will be explained hereinbelow.

The filter apparatus of the second embodiment is adapted to be employed when the upstream piping portion of said filter apparatus relatively is short. In case of use of the filter apparatus of the second embodiment, when the cover 3 attached to the cylindrical casing or an oil vent 25 screwed to the cover 3 is removed in order to take out the filter element, the fluid not only in the filter chamber but also in the upstream piping portion 8 (not shown in FIG. 3) flows out and is lost. However, since the volume of the fluid contained in the upstream piping portion is relatively small, the loss of the fluid is rather small.

Figure 3:
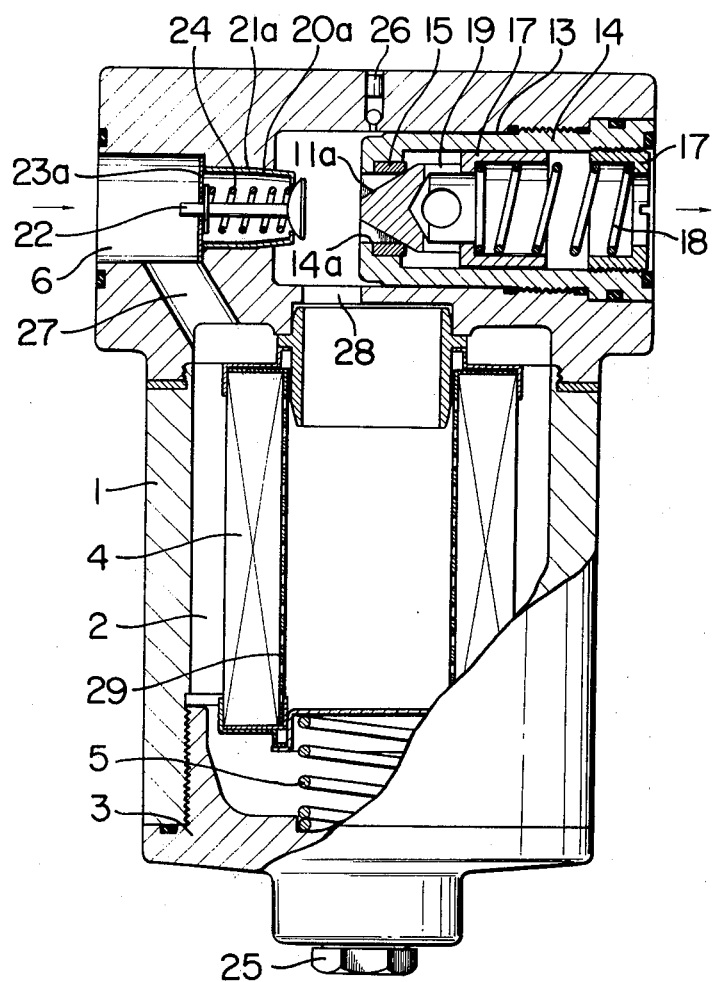
FIG. 3 is a longitudinal sectional view showing a second embodiment of the present invention.

Referring to FIG. 3, the second embodiment of the present invention will be described hereinafter. The bypass valve 21a is constructed according to the prior art and comprises a front disk 23a having apertures through which the fluid passes, a housing 20a fitted into an opening bored in the casing 1. The by-pass valve 21a has a valve body stem 22 extending through the front disk and the valve housing 20a. A tension spring 24 is placed inside of the valve housing 20a and around the valve stem 22 so as to open or make a by-pass passage of the fluid through the housing 20a. The purpose of this by-pass valve 21a resides in that when the amount of the entering oil is too much to flow through the fluid passage 27, the oil overflows or by-passes through the by-pass valve 21a.

Thus, in the apparatus of the second embodiment constructed in such manner as mentioned above, the oil flow inlet 6 of the casing 1 is connected with the upstream piping portion 8 (not shown in FIG. 3), while an oil outlet is connected with the downstream piping portion 9 (not shown in FIG. 2) respectively. In operation, the oil pressurized under a predetermined pressure a pump enters into the oil or fluid inlet 6 from the upstream piping portion 8, passes through and flows into the filter chamber 2. The oil passes through the filter element 4 and a perforated core cylinder 29, and flows upward. While the oil passes the filter element 4, the oil is filtered and purified through the filtering function of the filter element. Thereafter, the oil flows from the core cylinder 29 to a communicating passage 28. The pressure of the oil having reached around a sloped valve portion 11a of the valve portion 17 pushes and moves the valve portion 17 of the valve body 14 towards the oil outlet side (rightward as shown) against the spring force of a coil spring 18, thereby a flow-into an opening portion 14a of an outer cylindrical valve portion 13 of the valve body 14 is opened.

The construction of the filter according to the second embodiment of the present invention will be further described concerning the functioning or operation of the apparatus. The oil passes through a circular clearance between a valve seat 15 and the sloped valve portion 11a and fluid passage 19 formed in the valve portion 17, entering into an annular space of the valve portion 17. The inner space is in communication with the down-stream piping portion 9. As apparently shown in FIG. 3, the valve portion 17 is contained or inserted within the valve body 14 and biassed forwardly by means of the compression coil spring 18 contained within the valve portion 17. In order to purify or exchange the filter element, the oil contained in the down-stream piping portion and in the space of the valve body 14 is automatically prevented from flowing out of the cylindrical casing 1 by means of the compression coil spring 18 and only the oil contained in the up-stream piping portion and the filter chamber 2 flows through the filter apparatus constructed according to the second embodiment of the present invention. Practically, first, the pressure generating means such as a pump is stopped in order to suspend flow of the oil supply flowing into the oil or fluid inlet 6 of the filter apparatus. In consequence, the pressure in the filter chamber 2 is lowered and the pressure in the fluid outlet is hightened, whereby the valve portion 17 of the valve body 14 moves leftwardly with assistance of the coil spring 18, closing the flow-into opening portion 14a of the valve body 14. Consequently, when the opening portion 14a is closed, the oil of the down-stream piping portion can be prevented from entering into the filter chamber 2. In order to drain the oil contained in the filter chamber 2, an oil vent 25 mounted in the cover 3 is removed.

As a next step, the cover 3 is removed from the filter chamber 2, so that the filter element 4 is pulled out of the filter chamber 2 and a new filter element is inserted into the filter chamber 2, and finally the cover is attached to the filter chamber.

As apparent from the foregoing description, the first embodiment of the present invention includes a single valve body provided with two valve portions adapted to be placed at the fluid inlet and the outlet of the filter apparatus and an auxiliary valve placed within the valve body. The filter apparatus of the second embodiment comprises a single valve body having a valve portion located at the outlet of the filter apparatus and a by-pass valve for by-passing the overflowing oil more than a predetermined amount without passing through the filter element. Both the filter apparatus of the first and the second embodiments can be employed individually or separately according to the purpose and the construction of the hydraulic system.

What is claimed is:

1. A filter device comprising, a filter casing, having a filter element chamber for removably housing a filter element therein, said housing having an inlet with a valve seat and an inlet passageway communicating with said inlet and said chamber, means defining a second passageway outwardly of said chamber for passage of fluid from a filter element therein outwardly of said housing, means defining a second set circumferentially of said second passage upstream of an outlet of said second passageway from said casing, an elongated valve element slidable axially in said second passageway in response to fluid under pressure in said second passageway having a portion biased to seat on said second seat and close said second passageway, biasing means biasing said valve element in a direction for seating on said seat and closing said second passageway, and said valve element comprising a second portion axially of the first portion thereof and integral therewith for seating on the first-mentioned seat for closing said inlet passageway.

2. A filter device according to claim 1, including a check valve on said second portion for opening said inlet passageway in response to said fluid under pressure at a pressure less than the pressure to which said elongated valve element responds, and another biasing means biasing said check valve to seat on said first-mentioned seat exerting less biasing force than the first-mentioned biasing means.

3. A filter device according to claim 2, in which said check valve comprises a ball check valve transported on said second portion of said elongated valve element, and said another biasing means comprises a spring housed in said second portion of said elongated valve element.

4. A filter device according to claim 1, including a by-pass valve having a valve element seated on the first-mentioned seat, and means biasing the by-pass valve element in a direction for seating on said first-mentioned seat.

* * * * *